(12) United States Patent
Foley et al.

(10) Patent No.: US 8,151,734 B1
(45) Date of Patent: Apr. 10, 2012

(54) TRAINING DEVICE AND METHOD OF USING

(75) Inventors: Steve Foley, Robertsdale, AL (US); Howard Finley, Pensacola, FL (US)

(73) Assignee: S&S Enterprises, LLC, Gulf Shores, AL (US)

( * ) Notice: Subject to any disclaimer, the term of this patent is extended or adjusted under 35 U.S.C. 154(b) by 0 days.

(21) Appl. No.: 12/780,114

(22) Filed: May 14, 2010

Related U.S. Application Data

(60) Provisional application No. 61/178,825, filed on May 15, 2009.

(51) Int. Cl.
*A01K 37/00* (2006.01)
*A01K 27/00* (2006.01)
(52) U.S. Cl. .......................... 119/712; 119/769; 119/702
(58) Field of Classification Search .................. 119/701, 119/704, 784, 519, 516, 751, 752, 839, 843, 119/403, 732, 769; 54/71, 72; 472/36
See application file for complete search history.

(56) References Cited

U.S. PATENT DOCUMENTS

| | | | |
|---|---|---|---|
| 453,727 A | 6/1891 | Sample | |
| 464,113 A | 12/1891 | Cashion | |
| 639,215 A | 12/1899 | Craig | |
| 877,504 A | 1/1908 | Hoover | |
| 1,621,760 A * | 3/1927 | Stader et al. | 119/725 |
| 2,868,168 A * | 1/1959 | Dunn | 119/423 |
| 2,949,095 A * | 8/1960 | Wood | 119/426 |
| 4,027,629 A * | 6/1977 | Pearson | 119/752 |
| 4,130,091 A * | 12/1978 | Knudson | 119/701 |
| 4,136,640 A * | 1/1979 | Gofflot | 119/732 |
| 4,829,937 A * | 5/1989 | Weelink | 119/727 |
| 5,111,773 A * | 5/1992 | Akins | 119/732 |
| 5,842,443 A * | 12/1998 | Steinfort | 119/726 |
| 5,908,009 A * | 6/1999 | Cummings | 119/734 |
| 5,979,365 A * | 11/1999 | Sorraghan et al. | 119/524 |
| 6,425,351 B1 * | 7/2002 | Mollhagen | 119/733 |
| 6,817,318 B1 | 11/2004 | Kurt | |
| 6,942,487 B2 * | 9/2005 | Corbalis | 434/247 |
| 7,089,720 B2 * | 8/2006 | Kurt | 54/71 |
| 7,287,490 B2 * | 10/2007 | Kurt | 119/712 |
| 7,389,749 B1 * | 6/2008 | Choate | 119/726 |
| 2003/0172881 A1 * | 9/2003 | Dehod | 119/729 |
| 2006/0236661 A1 * | 10/2006 | Kurt | 54/71 |
| 2008/0308047 A1 * | 12/2008 | Mollhagen | 119/734 |
| 2010/0242858 A1 * | 9/2010 | Swires | 119/712 |

* cited by examiner

*Primary Examiner* — Kimberly Berona
*Assistant Examiner* — Joshua Huson
(74) *Attorney, Agent, or Firm* — Anthony J. Bourget

(57) ABSTRACT

The invention discloses a movable cradle capable of surrounding or enclosing an animal. The movable cradle may have a frame with a back end that opens and locks closed, and leg spaces or portions that bow-out from a general rectangular shape of the frame. Wheels may be attached to the frame near a back end of the cradle and near a front end of the cradle. The movable cradle may be used to train a surrounded animal.

17 Claims, 7 Drawing Sheets

TRAINING DEVICE AND METHOD OF USING

RELATED APPLICATIONS

This application claims the benefit and priority of Provisional Patent Application Ser. No. 61/178,825 filed May 15, 2009, for an Animal Training Device, under 35 U.S.C. §119(e).

FIELD OF THE INVENTION

This invention is generally directed to training devices and more specifically, the invention relates to a mobile device for training animals.

BACKGROUND INFORMATION

Horses and other quadrupeds may be desensitized and conditioned for training purposes and various functions. Past training or breaking-in methods or theories include obtaining complete control over the quadruped so that at all times the animal feels or always senses the power of the person exercising the control over the animal.

Training tools and devices are known for assistance in animal training methods and techniques. Such training devices include various harnesses and other tools that contact or restrict movement of a quadruped.

SUMMARY OF THE INVENTION

Although quadruped or horse training devices may be known for the purpose of training horses, the inventors have realized improvements thereon. Applicants have realized that there are no existing horse training devices to effectively restrain a horse while desensitizing the horse to human interaction. Applicant has realized these deficiencies and has developed a novel horse training device that provides a humane training harness, guide or "cradle" that instills in a horse, on which it is fitted, confidence/comfort in a trainer or rider or general interaction with humans, while making the device safe and easy to use by a trainer or other user.

An object of the invention is to provide a training device that may be left connected to an unattended horse for an extended period of time. Such use of the inventive "cradle" may instill patience in the horse between training sessions.

A further object of the invention is to provide a training device that may be adjustable for various sized animals.

A further object of the invention is to provide a training device that may provide means for preventing a horse in the "cradle" from using their natural instinct (i.e., fight or flight instincts) and inadvertently causing harm to a trainer.

A further object of the invention is to provide a training device that allows a trainer to influence the behavior of a horse from a location remote from the horse.

A further object of the invention is to provide a training device that allows horse training assistants, not yet experienced, to assist with desensitizing the animal to human interaction. Thus, the inventive training device may be used to train horses as well as to teach humans.

A further object of the invention is to provide a training device that allows a horse to safely be used in conjunction with hippotherapy, and specifically, safe for the disable rider.

A further object of the invention is to provide a device that creates a controlled environment. Such a controlled environment may allow a horse to safely be used in conjuction with rider training lessons.

A further object of the invention is to provide a device that may be used by veterinarians or farriers as a portable stock and may allow the veterinarians or farriers to examine or administer to an animal in a controlled environment while away from an office.

The objects of the invention may be accomplished by providing a device that allows an animal to enter through a rear portion of the "cradle" and once the animal enters the device, surrounds the animal on at least three sides. The device may have at least two wheels attached thereto and a rear strap or bar that may be used to completely enclose the animal within the device. Further the device may be attachable to a tongue or tow-bar and the tongue or tow-bar may further attach to a motor vehicle in order to pull the device or animal, or both, for the purpose of training the animal or transporting the device or other purpose.

The above summary of the present invention is not intended to describe each illustrated embodiment, aspect or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

Figure 1:
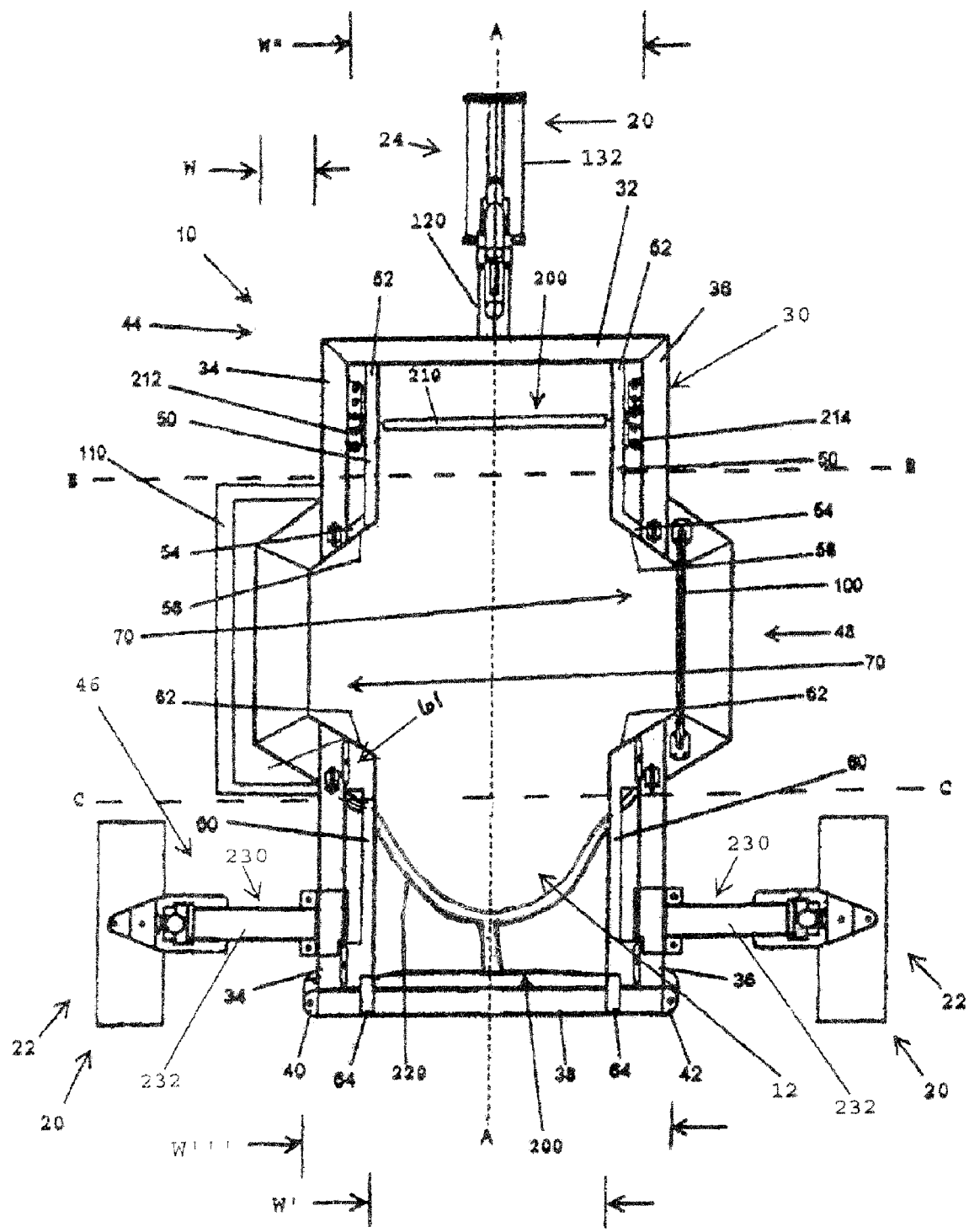
FIG. 1 is a top plan view of an embodiment of the invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover preferred modifications, equivalents and alternatives falling within the spirit and scope of the invention and as defined by the appended claims.

DETAILED DESCRIPTION OF THE DRAWINGS

The subject training device 10 and method of using device 10 may take on numerous physical embodiments within the spirit of the invention and only preferred embodiments have been described in detail below, which are not meant to limit the scope or spirit, or both, of the invention.

For description purposes, the depicted training device 10, or "cradle", has been split into three sections: front portion 44; back portion 46; and middle portion 48. The sections are depicted in FIG. 1 and are separated by lines B-B and C-C. These portions of device 10 have been pointed out simply for ease of description and are not meant to impart limitations upon device 10. It is contemplated that features of device 10 that have been described with respect to portions 44, 46, 48 may cross portions, without being specifically mentioned, depending on the size of the features or the size of the device or other considerations.

As seen in the Figures, device 10 may take many forms. Device 10 may be used or transported with or without an enclosed animal by attaching the device 10 to a motor vehicle or any other device capable of pulling or pushing the device.

Device 10 generally comprises a frame 30, that forms an enclosed area 12 generally surrounded by front bar or piece 32, side bars or pieces 34, 36 and back bar or piece 38. Frame 30 may surround an animal on at least three sides. All joints of frame 30 and any or extension extending from, or to, the frame may be adjustable for different sized animals or for other purposes. As mentioned, device 10 may be described as having three general areas of frame 30: front portion 44, back portion 46 and middle portion 48. Further, any or all portions of frame 30 may be covered with pads for the purpose of protecting the enclosed animal and humans when they come into contact with frame 30.

Device 10 may have at least two wheels 20. Wheels 20 of the device may be attached to, and extend from, various portions of device 10. For example, two back wheels 22 may extend from back portion 46 of device 10. Further, device 10 may include at least one front wheel 24 extending from front portion 44 of frame 30. Wheels 20 may be capable of rotating in any direction or be limited in rotation. Preferably, at least front wheel(s) 24 extending from front portion 44 of frame 30 may be capable of rotating three hundred sixty (360) degrees. Thus, front wheel(s) 24 of device 10 may move freely (i.e., wheels 24 may move in the direction of movement of the device 10 and may freely rotate left or right).

Numerous bars are mentioned with respect to the device 10 and frame 30. These bars, generally, may take on any shape, size or dimension and may be made with any material, limited only by structural requirements of the described training device 10. For example and generally, the bars may be hollow or solid, thick or thin, and may be made of steel or other material that is strong, preferably light and fulfills the structural requirements of device 10 or other similar material.

Front Portion

Frame 30 may have a front bar 32, a first side bar 34 and a second side bar 36. First side bar 34 and second side bar 36 may each have a front end and a back end. At a front portion 44 of frame 30, and as seen in FIG. 1, front bar 32 side bars 34, 36 may be connected to each other. Such connection may be made at front ends of side bars 34, 36 and at, or near, the ends of front bar 32, and be made by any known method or means and may be rigid or adjustable. For example, a rigid connection may include a weld connection. Front ends of side bars 34, 36 may have an inside portion separated by a width W'''.

A front portion 44 of frame 30 may also include front fit bars 50. As seen in FIG. 1, two front fit bars 50 may be located in a general front portion 44 of frame 30 and may extend into middle portion 48 of frame 30 and may be spaced apart a width W'', where width W'' is less than width W'''. Front fit bars 50 may be attached to front bar 32 at respective first ends 52 and one front fit bar 50 may attach to first side bar 34 at a second end 54 and a second front fit bar 50 may attach to second side bar 36 at a second end 54. As seen in FIG. 1, the two front fit bars 50 may extend perpendicularly from front bar 32 and extend toward a middle portion 48 of frame 30, running generally parallel to, and any distance from, respective side bars 34, 36, and then taper toward those respective side bar 34, 36 at a distance from the front bar 32.

The parallel portion of front fit bars 50 may be a preferred distance from respective side bars of three and a half (3.5) inches, respectively, and such a distance may be adjustable depending on the size of an at least partially enclosed animal or other factors. Front fit bars 50 may extend generally perpendicularly from front bar 32 toward a middle portion 48 of frame 30 any distance and the distance may be user adjusted. A preferred distance or length of fit bar (as measured from front bar 32 to taper 56) may be twenty-one and three-fourths (21.75) inches and such distance may be adjustable (and the fit bar may be adjustable) based on the size of an at least partially enclosed animal or other factor(s). A more preferred distance or length of fit bar 50 may be three to four inches shorter than the distance noted above in order to provide additional knee-clearance (i.e., a greater leg space 70) for a user mounted on the animal. Tapers 56 of front fit bars 50 may make any angle with respect to the respective side bars 34, 36, and the angle may be user adjusted. Preferably that adjustable angle is a forty-five degree angle.

Front fit bars 50 may be utilized for any purpose; for example, for use in controlling the movement of an enclosed animal. Specifically, tapers 56 of front fit bars 50 may serve a purpose of assisting in centering an enclosed animal (e.g., a quadruped) within frame 30.

Front bar 32 of frame 30 may be connected to an extension piece 120. Extension piece 120 may be rigidly connected to front bar 32 and may comprise multiple pieces. The multiple pieces of extension piece 120 may include a first shaft 122 that is slidably engagable with a second shaft 124 (See, for example, FIG. 2). First shaft 122 may connect to a wheel bar 130 with a rigid or non-rigid connection. Second shaft 124 may connect to front bar 32 with a rigid or non-rigid connection. Shafts 122, 124 may be any shape or size that may be capable of supporting frame 30. Further, first shaft 122 may be formed so as to be capable of sliding into second shaft 124 and first shaft 122 may connect with shaft 124 with an adjustable connection; for example, a pin-lock connection or nut and bolt connection or other similar connection.

The first shaft 122 and second shaft 124 may be adjusted by the use of an adjusting system 150; for example, a jack. Adjusting system 150 may comprise at least two parts that engage each other. In a first adjusting location, adjusting system 150 may connect to second shaft 124 and wheel bar 130 or first shaft 122, or may be connected at other locations of front portion 44 allowing second shaft 124 to be adjusted with respect to first shaft 122. First adjusting part 152 may adjustably engage second adjusting part 154 at one end and engage wheel bar 130 at a connecting end 156. The connection between first adjusting part 152 and wheel bar 130 may be adjustable and may pivot around a single axis. Second adjusting part 154 may connect to second shaft 124 via extender 158. Extender 158 may provide any type of connection between second adjusting part 154 and second shaft 124 and the connection type may be rigid or non-rigid and may include a single component or multiple components. Extender 158 may be attached or integrally connected to second adjusting part and may fit over a peg that extends from second shaft 124. Extender 158 may be lifted from the peg in order for adjusting system to be detached from second shaft 124. A pin or pivot may be removed to detach first adjusting part 152 from wheel bar 130. Adjusting system 150 may then be used as a jack by connecting extender 158 to tow bar receiver 146 or other portion of device 10 so that device 10 may be raised/lowered for purposes of alignment with a hitch of a vehicle or for other purposes. Preferably a single adjusting system 150 accommodates interchangeable use as a jack for both raising/lowering device 10 and for adjusting second shaft 124 with respect to first shaft 122.

Figure 2:
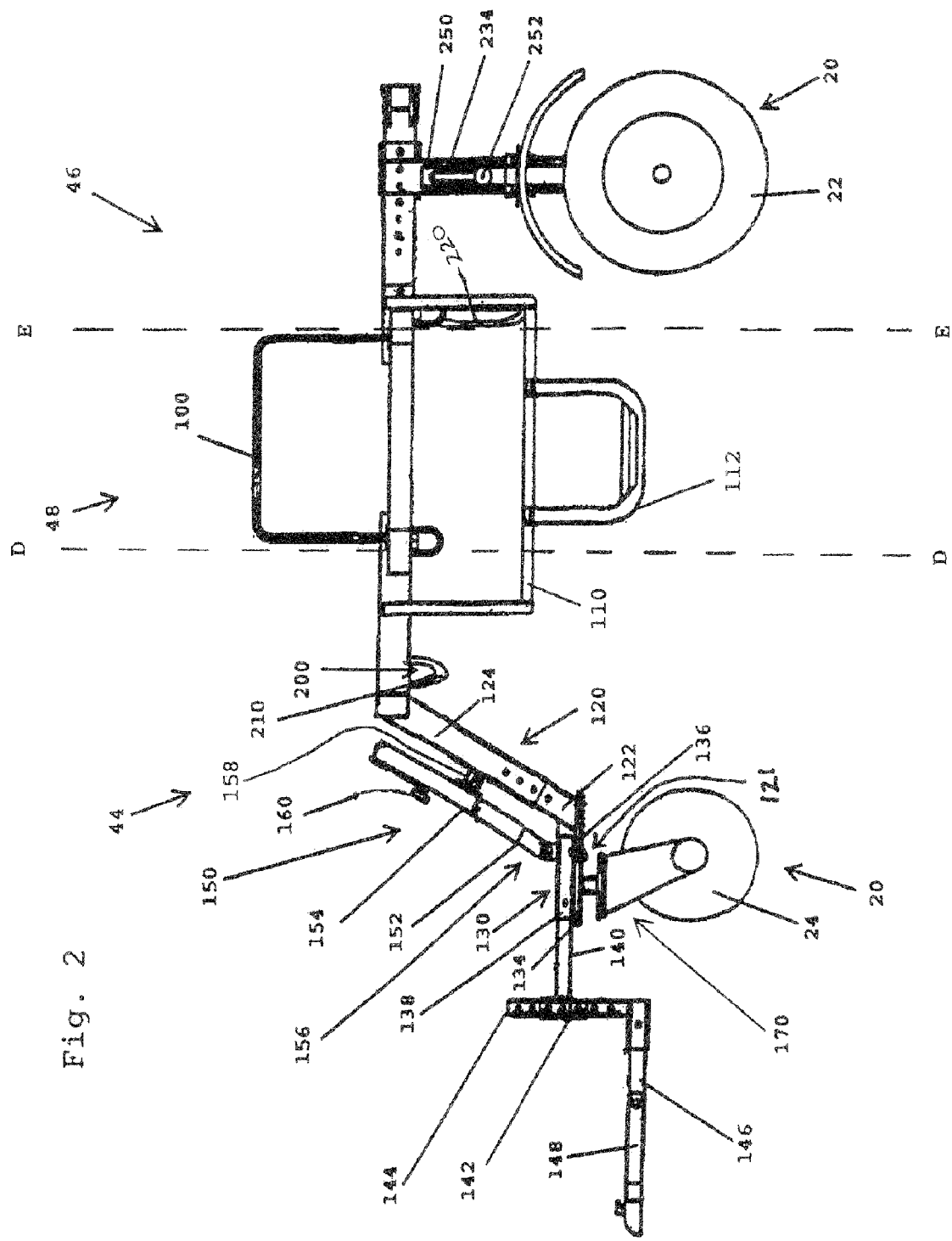
FIG. 2 is a side view of the embodiment of FIG. 1.
Figure 3:
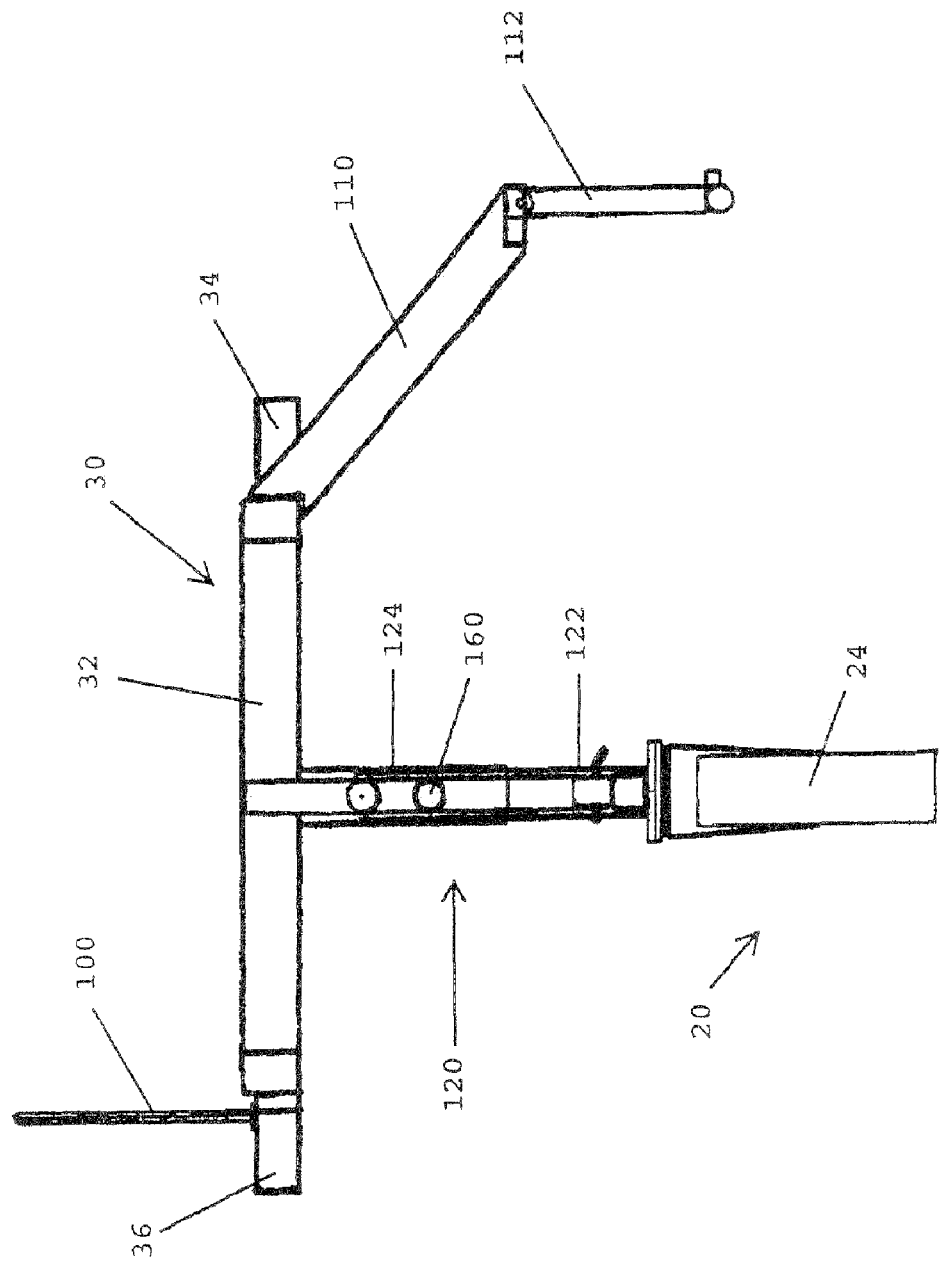
FIG. 3 is a front view of a front portion of the embodiment of FIG. 1.

Adjusting system 150 may include a crank 160, or other feature that is commonly known as a substitute for a crank, for a purpose of raising or lowering front portion 44 of device 10. Crank 160 may be used with, or as an alternative to, manual forces or hydraulics or electrical forces or a combination thereof or other types of forces to adjust first shaft 122 with respect to second shaft 124. For example, crank 160 may be manually rotated to raise or lower first shaft 122 with respect to second shaft 124. Further, as seen in FIG. 2, adjusting system 150 may be removably connectable to second shaft 124 and wheel bar 130 or first shaft 122, or both. Such connection may allow adjusting system to adjust the location of first shaft 122 with respect to second shaft 124.

Adjusting system 150 may be connected to front portion 44 in a second adjusting location. In the second adjusting location, extender 158 may be removably or detachably connected to either wheel bar 130 or first shaft 122 so as to allow front portion 44 to be positionably adjusted with respect to a ground surface on which wheels 20 contact. In the second adjusting location, connecting end 156 may attach to a footer (not shown) and the footer may rest on the ground surface.

Figure 6:
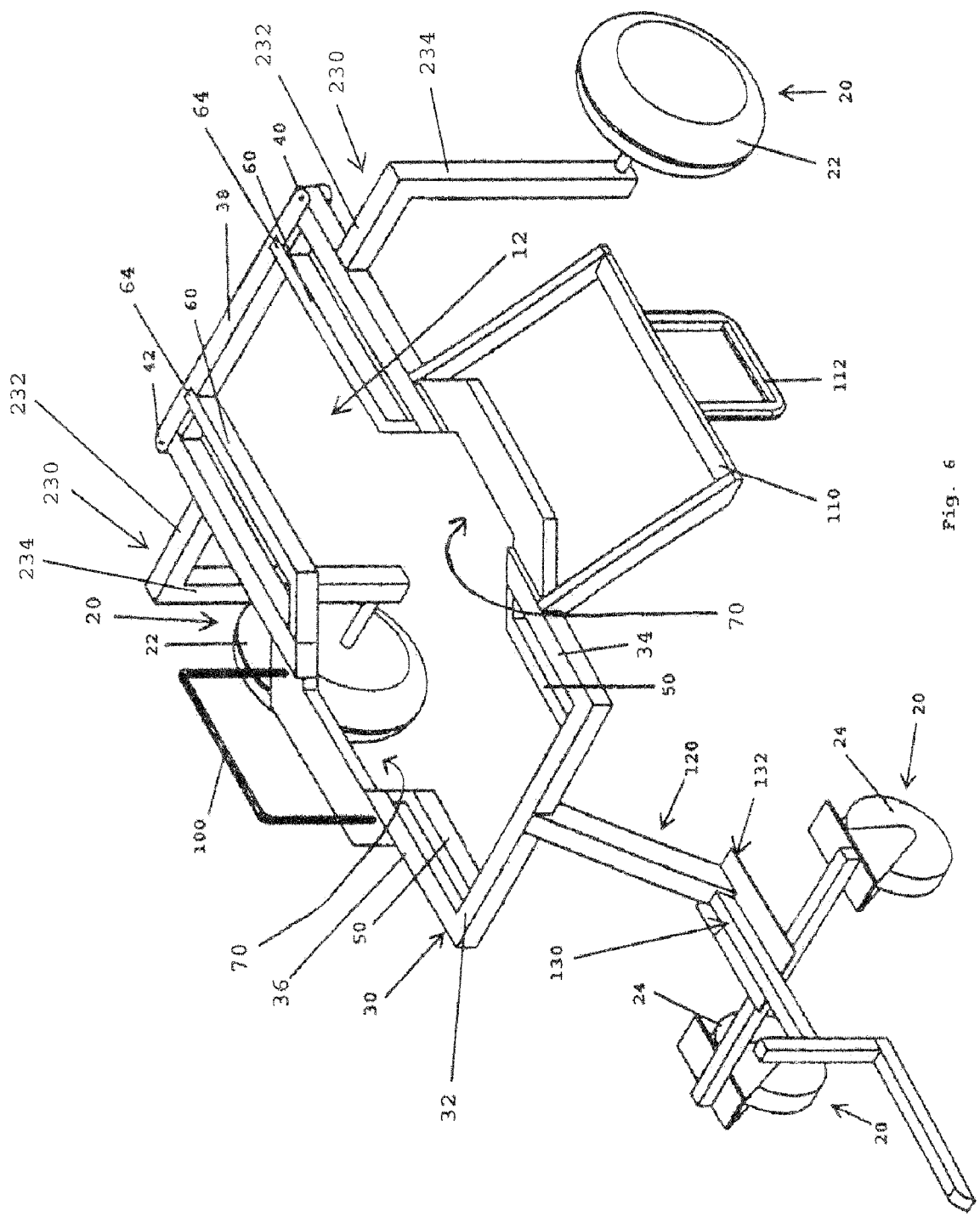
FIG. 6 is a perspective view of an embodiment of the invention.

Front wheel(s) 24 as seen in FIGS. 1 and 2, may be connected to wheel bar 130 via a wheel plate 132 (see also FIG. 6). Wheel plate 132 may have a first plate 134 rotatingly attached to a second plate 136. First plate 134 may be attached to second plate 136 in such a manner that wheel plate 132 may be, or resemble, a hinge which pivots about pivot 121 (See FIG. 2). As a result of plates 134, 136 being rotatingly connected, wheel system 170 may be rotated from a first position touching, or nearly touching, a ground surface to a second position where wheel system 170 is secured against extension piece 120. Wheel system 170 may be secured to extension piece 120 by any securing or connection technique; for example, a strap may be utilized for securing wheel system 170 to extension piece 120. In further detail, wheel system 170 may rotate about pivot 121; particularly first plate 134 pivots about pivot 121 which results in wheel 24 swinging to a position adjacent to or abutting extension piece 120. A strap may then be connected from a bar, such as first side bar 34 or other bar or location of device 10 to secure wheel 24 in the upright location.

Wheel bar 130 may comprise multiple pieces; for example, wheel bar 130 may have a first wheel bar 138 and a second wheel bar 140. First wheel bar 138 and second wheel bar 140 may slidably engage each other and may be secured in a stable position via connector. An example of a connector may include a pin-lock mechanism or nut and bolt connection or other similar connection mechanism.

Second wheel bar 140 of wheel bar 130 may be rigidly connected to vertical bar receiver 142, as seen in FIG. 2. Vertical bar receiver 142 may slidably receive vertical bar 144 and vertical bar 144 may be vertically adjusted within vertical bar receiver 142. Vertical bar 144 and vertical bar receiver 142 may be connected in any manner; for example, vertical bar 144 and vertical bar receiver 142 may be adjustably connected with a pin-lock connection mechanism or nut and bolt connector or other connection mechanism.

Further, vertical bar 144 may be connected to tongue or tow bar receiver 146 and tow bar receiver may be connected to receiver tow bar 148 or tongue. As shown in FIG. 2, at a first end of tow bar 148, tow bar 148 may be adjustably connected to tow bar receiver 146. Tow bar 148 may be connected to tow bar receiver with any type of connection; for example, a pin-lock connection mechanism or nut and bolt connection or other connection mechanism. At a second end of tow bar 148, tow bar 148 may connect to a vehicle or other object that may be able to tow or move device 10.

In addition to framing 30 and wheels 20, device 10 may include numerous straps 200. Straps 200 may allow further assistance in controlling an animal located in device 10. For example, device 10 may have a front strap 210 located between first side bar 34 and second side bar 36. A first end of front strap 210 may attach to first side strap adjust bar 212 and a second end of front strap 210 may attach to second side strap adjust bar 214 (See FIG. 1). Strap adjust bars 212, 214 may be attached to side bars 34, 36 and may have multiple holes, or other adjusting means, allowing for adjustment of the location of front strap 210. The location of front strap 210 may depend on the size and placement of an animal within device 10, among other factors.

An animal within device 10 may press against front strap 210 to move device 10 forward. Allowing an animal to press against a strap as opposed to a rigid front bar 32 may be more comforting for an enclosed animal.

Back Portion

Frame 30 may have a back bar 38 or back strap 220, or both, that is (are) attachable to first side bar 34 and second side bar 36. At a back portion 46 of frame 30, and as seen in FIG. 1, a first end 40 of back bar 38 may overlap or attach to, or both, first side bar 34 and at a second end 42, back bar 38 may overlap or attach to, or both, second side bar 36. Back bar 38, back strap 220 and back portion 46, generally, may be covered with pads for the purpose of protecting an enclosed animal and human users of device 10 as both may come into contact with frame 30.

Back bar 38 may detach from side bars 34, 36 at either end or both ends 40, 42. Back bar 38 may be pivotally attached to side bars 34, 36 with a pin-lock mechanism or nut and bolt mechanism, or other attaching mechanism, at respective ends 40, 42. When back bar 38 is in a closed position, the pin on a side to be opened (e.g., side of first end of back bar 40) may be removed and that end of back bar 38 may be opened and back bar 38 may pivot around the pin located in the opposite end (e.g. the side of second end of back bar 42) of back bar 38. As a result of utilizing a pin lock system, or similar system, on each end 40, 42, back bar 38 may swing or pivot open to either side of device 10.

The opening of back bar 38 or back gate may be particularly important when training horses. If back bar 38 opens in the direction of a fence or wall, which is next to where device 10 is situated, back bar 38, in a horses eyes, becomes part of the fence or wall and the horse may not feel trapped and may be more willing to enter or exit device 10. Thus, a back bar 38 detaching from frame 30 on either end 40, 42 allows for efficient use of stall 10 at least because it can be positioned in the last direction of movement of stall 10 without the concern as to whether an animal will require more or less directing to enter or exit stall 10. A key feature of device 10, and having a moveable back bar 38 is that it allows for an animal to enter the device by walking forward into device 10 as opposed to backing into a device or as opposed to moving a device upon a standing animal from a direction behind the animal. Back bar 38 is intended to be positioned behind the animal when the animal is cradled within device 10.

As depicted in FIG. 1, back fit bars 60, extending from back portion 46 to middle portion 48 of frame 30, may be attached to respective side bars 34, 36. Back fit bars 60 may be spaced apart a width W'''. That is, a first back fit bar 60 may attach to first side bar 34 at one end of the first back fit bar 60 and the same first side bar 34 at a second end. Second back fit bar 60 may attach to second side bar 36 at one end of second back fit bar 60 and the same second side bar 36 at a second end. Each back fit bar 60 may be tapered or have a taper 62 at a first end or a second end, or both, with a portion of back fit bar 60 being generally parallel with the respective side bar 34, 36. Back fit bars 60 may extend out from side bars 34, 36 any distance and that distance may be user adjusted. Back fit bars 60 may preferably extend five (5) inches from side bars 34, 36, although such distance may be adjustable.

Back fit bars 60 may be attached to frame 30 in any manner. In one aspect, back fit bars 60 may be attached to side bars 34, 36 in a manner that allows them to be adjustable from a closed position to an open position where an angle between the closed position and the open position may be any angle, but preferably is generally between zero and one hundred eighty degrees and more preferably, one hundred eighty degrees. An example of a connection that allows for such movement of back fit bars 60 may be a hinge connection or pin-joint. Back fit bars 60 may rotate upward (or downward) to establish a greater path into device 10 when in an open position that may be less intimidating to an animal. For example, when back fit bars 60 are in an open position they may be spaced apart a width W" and when back fit bars 60 are in a closed position they are spaced apart a width W''', where width W" is greater than width W'''. Back fit bars 60 may utilize, for instance, a hinge 61 (See FIG. 1) to assist with rotation of fit bar 60 from a first closed position (as shown) to an open position where fit bar 60 rotates upward (or downward) to create greater clearance for entry of a horse into device 10.

As seen in FIGS. 1 and 6, back fit bars 60 may include lock pieces 64. Each back fit bar 60 may include at least two lock pieces 64. Lock pieces 64 may extend in a back direction from a back portion of back fit bars 60. A first lock piece 64 may extend from an underside or bottom area of a back portion of back fit bar 60 and a second lock piece 64 may extend from a(n) aboveside or top area of a back portion of back fit bar 60 (the terms underside, bottom, aboveside, top refer to sides of features when the features are in a closed position and are being viewed from the vantage point of a person standing on the ground surface). First lock piece and second lock piece may be connected to back fit bars 160 so as to be directly above and below one another or off-set with respect to one another. When back fit bars 60 are in a closed position, lock pieces 64 may be capable of (and/or may define a space for) receiving back bar 38 when back bar 38 is in a closed position (e.g., the first lock pieces may abut an underside of back bar 38 and the second lock pieces may abut an aboveside of back bar 38). That is lock pieces 64 may engage back bar 38 when back bar 38 is closed. As a result, lock pieces 64, in conjunction with back bar 38, may function as part of a lock that keeps back fit bars 60 in a closed position even if an enclosed animal bumps or knocks into back fit bars 60.

Further, device 10 may include back strap 220. Back strap 220 may be connected to first side bar 34 at a first end and connected to second side bar 36 at a second end. Further, back strap 220 may connect to the side bars 34, 36 at a location back portion 46 of frame 30. Back strap 220 may hang down behind an enclosed animal. For example, back strap 220 may rest about two (2) inches behind an enclosed animal's back leg joints. Such positioning of back strap 220 may allow for a horse to be encouraged to move in the same direction as the device.

Back portion 46 of frame 30 may adjustably connect to back wheels 22. Back wheels 22 may connect to side bars 34, 36 via back wheel bars 230. Back wheel bars 230 may slidably connect to side bars 34, 36 on respective sides of frame 30 via pin-lock mechanisms or nut and bolt systems or any other removable connection system. As a result of this connection, back wheels 22 may adjust horizontally.

Figure 4:
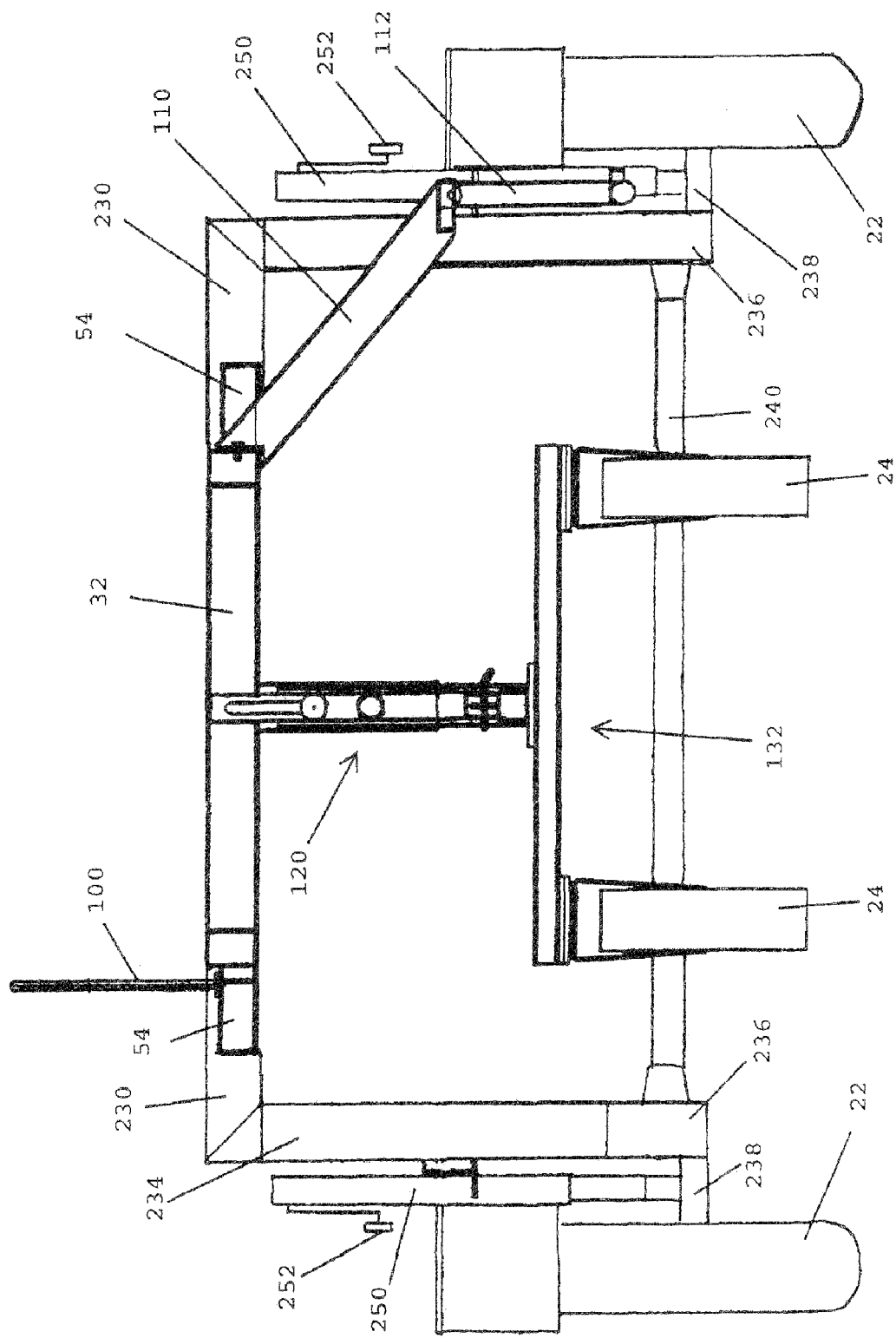
FIG. 4 is a front view of an embodiment of the invention.
Figure 5:
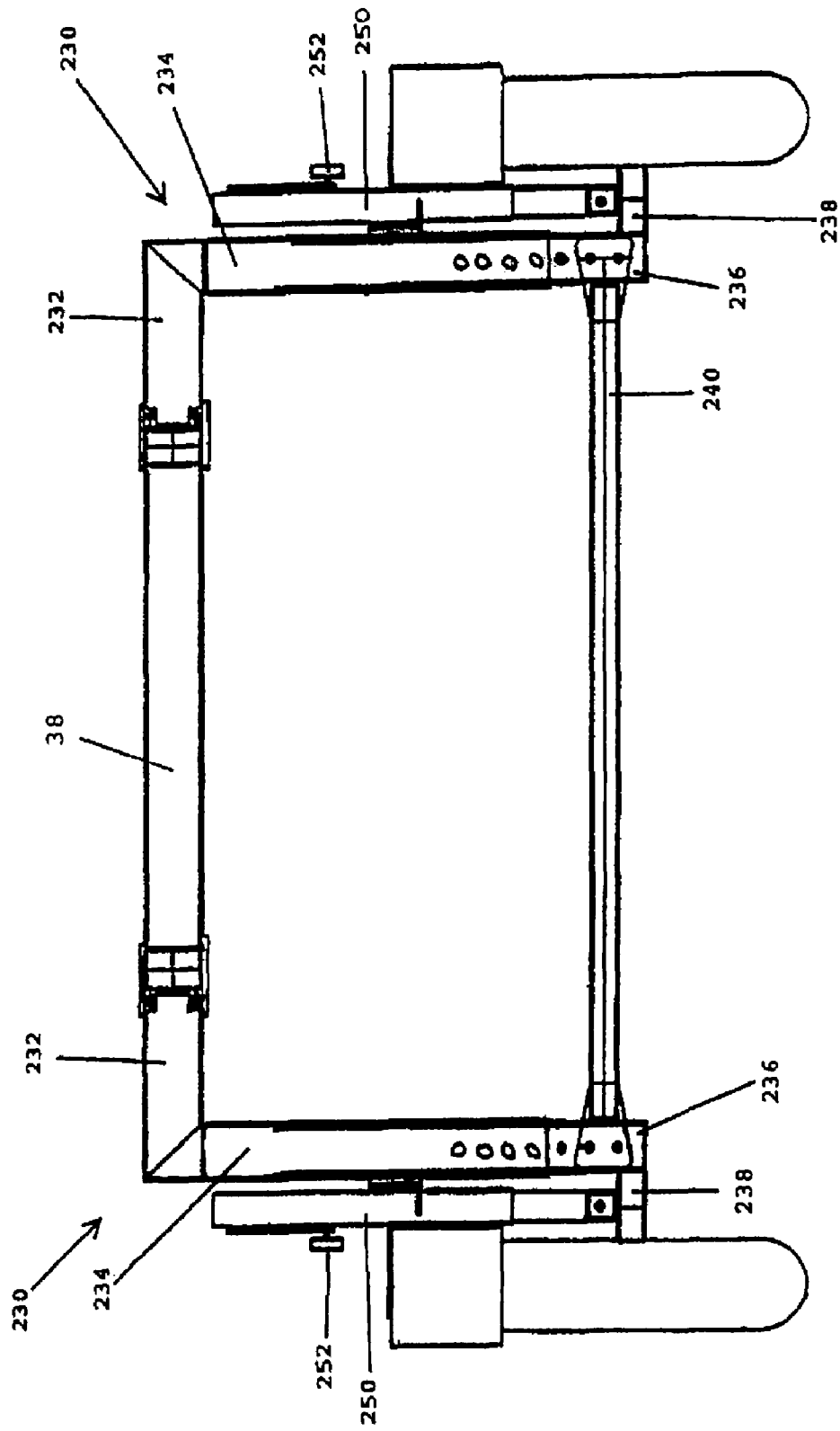
FIG. 5 is a back plan view of a back portion of the embodiment of FIG. 1.

Further, back wheel bar 230 may be made of at least two or more pieces that slidably engage one another and are connected to a jack 250 (FIG. 4) for vertically raising and lowering back wheel bar 230 and thus, back portion 46 of device 10. Back wheel bars 230 may comprise a horizontal back wheel bar 232, a first vertical back wheel bar 234 and a second vertical back wheel bar 236. At a first end of horizontal back wheel bar 232, horizontal back wheel bar 232 may slidably engage a side bar 34 or 36 and at a second end rigidly connect to a first end of first vertical back wheel bar 234. First vertical back wheel bar 234 slidably engages second vertical back wheel bar 236 which may also connect to axle 238.

An upper portion of jack 250 may be connected to first vertical back wheel bar 234 and a lower portion of jack 250 may be connected to second vertical back wheel bar 236 or axle 238. Jack 250 may be adjusted by any jack activation system. For example, the jack activation system may include a manually turned crank 252 or hydraulics or other similar activation system.

Adjustability of the back wheels may be desirable at least because the inventor has found an ideal positioning of back wheels 22 is at, or near, the back hips of an animal and such a position may change when different sized animals are located at least partially within device 10. As shown in FIG. 2 adjustment holes are provided in bar 34 so that back wheel bar 230 may slide along and be locked into first side bar 34 to adjust to the particular hip location of the animal.

As shown in the Figures, a stiffener 240 may be connected to back wheel bars 230 to stiffen back wheel 22 base while transporting device 10 over far distances. Stiffener 240 may connect to any portion of back wheel bars 230, at any location and by any connection system. For example, stiffener 240 may connect to a bottom portion of back wheel bars 230 using a bolt and nut connection or other connection type.

Middle Portion

Frame 30 may also include leg spaces 70. For example, each side bar 34, 36 may have a widened portion located generally in middle portion 48 of device 10 or between front and back portions 44, 46. Leg spaces 70 may extend outward with respect to a center line A-A of device 10 and have a width W' between an inside portion of respective leg spaces 70. Width W' may be greater than width W'''. Side bars 34, 36 may be formed, by any means, in a shape that allows for leg spaces 70 to be defined by side bars 34, 36. The portions of side bars 34, 36 forming leg spaces 70 may at least have a width W, wide enough for a person to comfortably sit upon a horse positioned within device 10. A purpose of leg spaces 70 may be safety for riders while they are on the enclosed animal. In the event the enclosed animal shifts within frame 30, the legs of a rider avoid contacting or being crushed against side bars 34, 36 of frame 30, but will instead slide within the open area of leg spaces 70, unharmed.

Although leg spaces 70 may be depicted as being defined by single piece (i.e., at least rigidly connected pieces) side bars 34, 36, leg spaces may be formed with multiple pieces of tubing or other material that are engagable and adjustable to change the size of leg spaces 70.

Frame 10 may also include steps 110, 112, handle(s) 100 or support bars extending therefrom. For example, a handle 100 may extend over, or adjacent to, a leg space opposite another leg space area from which steps 110, 112 may extend. This orientation of handle 100 and steps 110, 112 may assist a rider or trainer in mounting or demounting an animal enclosed within device 10.

Step 110 and extension step 112 may extend directly or indirectly from a side bar 34 or 36 opposite from the side bar 34 or 36 to which handle 100 is connected. As seen in the FIGS. 1-4 and 6, step 110 may extend a first vertical or horizontal, or both, distance from a vertical level and location of side bars 34, 36. Extension step 112 may extend a second vertical or horizontal, or both, distance from a vertical level and location of step 110. Further steps may be added to device 10 as desired to facilitate the use of device 10.

Harness and Straps

Numerous straps 200 may be used to connect an animal enclosed in device 10 to device 10 or for other purposes. As mentioned above, device 10 may utilize front and back straps 210, 220. Front strap 210 may act as a breast collar and back strap 220 may act as a britchen strap. A "breast collar" and a "britchen strap" are terms generally understood in the art.

Straps 200 may be used for general connection purposes or may serve a purpose of training the enclosed animal, or both. For example, rings may be placed at various spots on device 10 and those rings may correspond to rings on a harness or saddle of an enclosed animal and the rings of device 10 and the harness or saddle may be connected by straps 200 or other flexible connectors.

Figure 7:
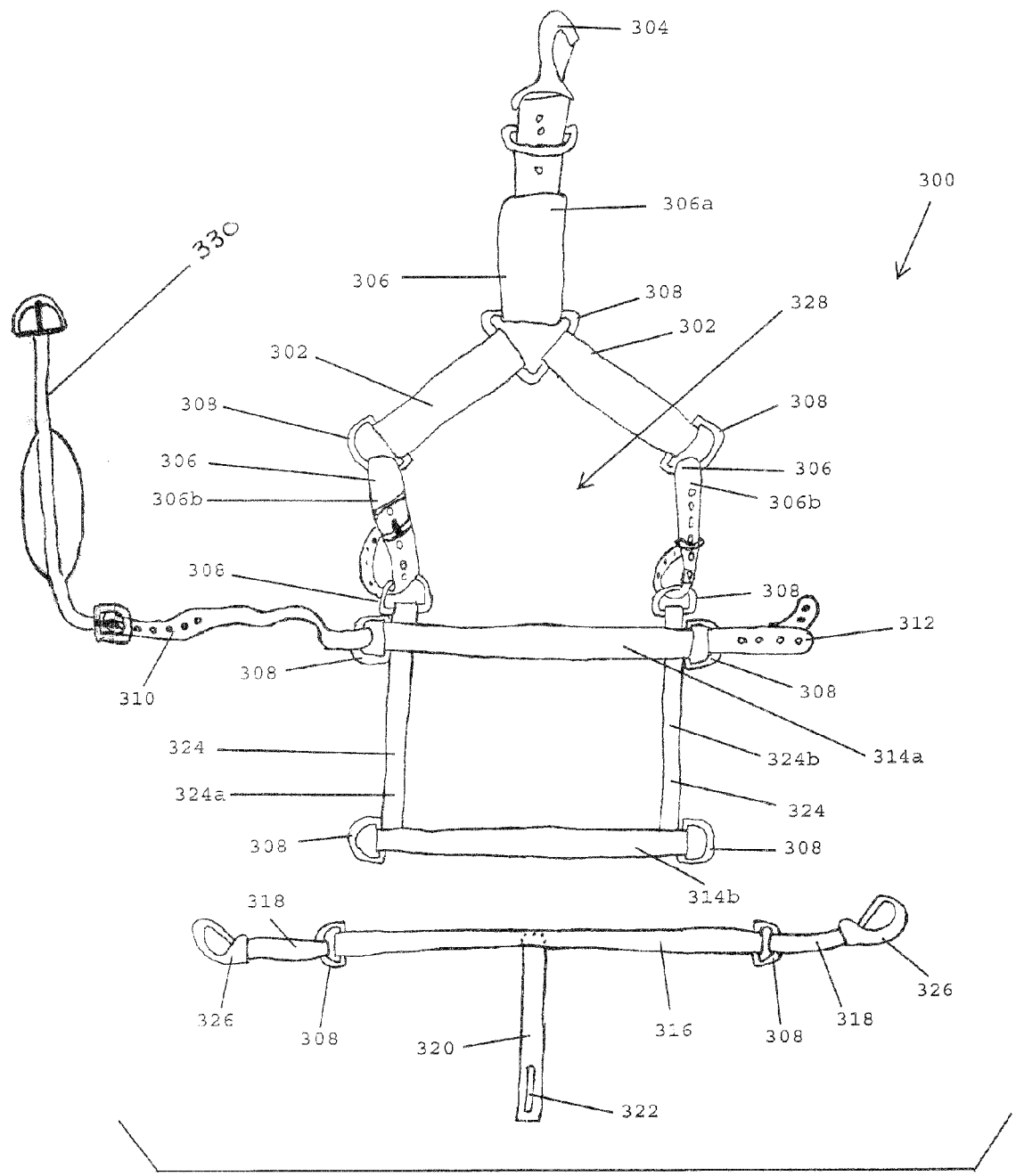
FIG. 7 is a top view of a further feature of the invention.

A harness 300 may be utilized in addition to, or as an alternative to, straps 200. Harness 300 may be any type of harness generally known to be used with a horse or other quadruped and may, generally, be placed on the horse or quadruped prior placing that animal in device 10. As seen in FIG. 7, harness 300 may include collar straps 302, hooks 304, connector straps 306, rings 308, side straps 324, eye straps 310, 312, girth strap 330, back straps 314, britchen strap 316, britchen connector straps 318, britchen back bar strap 320 and fastener 322. All straps of harness 300 may be made out of any material suitable for being used as a harness on a horse or other quadruped; for example, a heavy-duty nylon or leather. Rings 308 may be any material and may be any shape and size suitable for connecting straps of harness 300 to one another or other objects. For example, if three straps of harness 300 are to be connected, a triangle-shaped ring may be appropriate for the connection. Hooks 304 may be any material, for example a metal, that is capable of heavy use while maintaining its strength and ability to securely clasp to rings or other objects. Further, hooks 304 may be able to rotate about at least one axis; for example, hook 304 may be able to rotate about a central longitudinal axis of hook 304.

As seen in FIG. 7, second ends of collar straps 302 connect to ring 308 which is also connected to a first end of front connector strap 306a. A second end of front connector strap 306a may be connected to front connector hook 304 and when harness 300 is placed on a horse or other quadruped, front connector hook 304 may connect to eye straps 310, 312. Connector strap 306a may be adjustable in length; for example, connector strap 306a may utilize a belting system to shorten and lengthen the distance between its first end and second end.

As seen in FIG. 7, first ends of collar straps 302 may connect to rings 308, where rings 308 may also be connected to second ends of side connector straps 306b. Like front connector strap 306a, side connector straps 306b may be capable of having the length between a first end and a second end of side connector straps 306b adjusted. First ends of side connector straps 306b may connect to rings 308 that are also connected to second ends of side straps 324 (e.g., 324a, 324b), as depicted in FIG. 7. In the alternative, first ends of side connector straps 306b may connect to rings 308 connected to a first back strap 314a (this connection is not shown but may be appreciated).

Areas near second ends of side straps 324 may connect to first back strap 314a. Such connection may utilize any connection technique known in the art; for example, side straps 324 and back straps 314 may have a connection that is sewn together. Further, first ends of sides straps 324 may be connected to a second back strap 314b by any known connection technique. Generally, side straps 324 may be oriented substantially perpendicular to back straps 314.

First and second ends of first and second back straps 314a, 314b may be connected to rings 308. Straps 200 or other straps connected to device 10 may connect device 10 to harness 300 at rings 308, where rings 308 are also connected to back straps 314. Rings 308 attached to first back strap 314a may also connect to eye straps 310, 312. Eye strap 310 may connect to a ring 308 connected to a first side of first back strap 314a, and eye strap 312 may connect to a ring 308 at an opposite, second side of first back strap 314a. Eye strap 310 may be an extended eye strap, as shown in FIG. 7, and connect to a first end of a girth strap 330 with any belt connection technique known in the art or through any other adjustable connection technique. Eye strap 312 may be a double eye strap, as commonly known in the harness art, and may connect to a second end, opposite the first end, of girth strap 330 with any belt connection technique known in the art or through any other adjustable connection technique.

Harness 300 may include a britchen strap 316 that may (e.g., as depicted in FIG. 7) or may not (not shown) be separate from other portions of harness 300. Ends of britchen strap 316 may be connected to rings 308 and those rings may further connect to britchen connector straps 318. Britchen connector straps 318 may be adjustable in length by any known adjusting technique. Britchen connector straps 318 extending from opposite ends of britchen strap 316 may further connect to britchen hooks 326 for connection to device 10 or for another purpose. Britchen hooks 326 may rotate; for example, britchen hooks 326 may rotate a central longitudinal axis of hook 326.

Britchen strap 316 may operate by connecting britchen hooks 326 to first and second side bars 34, 36 or rings extending therefrom, which may result in britchen strap 316 hanging at a position behind a horse's, or other quadruped's, hind legs. Further, as shown in FIG. 7, a first end of britchen back bar strap 320 may connect to a substantially middle portion of britchen strap 316, as seen in FIG. 7. Britchen back bar strap 320 may operate to releasably connect britchen strap 316 to back bar 38 of device 10. Britchen back bar strap 320 may connect to back bar 38 (or padding thereon) by any releasable means; for example, a releasable connection may be achieved by utilizing hook and loop fasteners 322.

In addition to facilitating the connection of portions of harness 300, rings 308 may connect to straps 200 extending from portions of device 10. Further, rings 308 may be used to connect other objects to one another, and rings 308 are generally used to facilitate the connection of at least two objects.

Methods of Use

Prior to placing an animal in device 10, a harness or other straps may be placed on the animal. Harness 300 may be placed on the animal by inserting the head of an animal through a space 328 of harness 300 created, generally, by collar straps 302, connector straps 306 and first back strap 314a. When harness 300 is located on the animal, collar straps 302 should run along the breast of the animal. Then, harness 300 should be placed on the animal so that back straps 314 and side straps 324 lie generally on the back of the animal. Eye strap 310 may then be connected with first strap 330 which is then connected to eye strap 312 by wrapping straps 310, 312, 330 toward an underside of the animal and then engaging straps 310, 312, 330 with one another.

Movable device 10 may be used by guiding or pulling an animal (e.g., a horse) into frame 30 through a back portion 46 of frame 30 having back fit bars 60 in an open position. Once the animal is completely within frame 30, back fit bars 60 may be lowered into a closed position and back bar 38 or back strap 220, or both, may be used to enclose the animal within frame 30. If back bar 38 is used to enclose the animal within frame 30, back bar 38 may be received by lock pieces 64 on back fit bars 60.

Numerous straps may be used to assist in containing the enclosed animal within device 10. For example, a strap may attach to front bar 32 of frame 30 at one end and may attach to the enclosed animal's harness at another end. Other straps may extend from various locations along frame 30 and attach to various harnesses and rings on the enclosed animal, as desired to prevent bucking or side twisting by the animal or other undesirable movement of the animal.

Once a horse or other quadruped has been placed in device 10, back bar 38 is closed and straps 200 provide a connection between the enclosed animal's harness (e.g., harness 300, which may be placed on an animal prior to the animal entering device 10) and device 10. A britchen strap (e.g., 316) may be placed behind the animal. If britchen strap 316 is utilized, hooks 326 that are connected to britchen strap 316 may be attached to device 10. After britchen strap 316 has been hooked in place and is hanging behind the enclosed animal, britchen back bar strap 320 may be fastened or releasably connected to back bar 38 (or padding or other material thereon). After the britchen strap 316 has been properly placed around the enclosed animal and attached to device 10, device 10 may provide a relatively safe and comfortable training tool (i.e., for the enclosed animal and animal riders of all skill levels).

As many parts of movable device 10 may be adjustable, movable device 10 may take on numerous alignments. For example, it may be desirable to align back wheels 22 with a hip, or back leg, area of an animal inserted into movable device 10. Such alignment of back wheels 22 may allow device 10 to be operated or moved, or both, by an inserted animal or trainer in an efficient, realistic manner.

Further, there are many methods of using device 10. For example, one end of tow bar 148 may be attached to a portion of frame 30 that extends between front wheel 24 and front bar 44 of frame 30, and a second end of tow bar 148 may be attached to a motor vehicle for the purpose of leading device 10 while an animal is enclosed in device 10, or for other purposes. Device 10 may also be used without a motor vehicle and the enclosed animal may transport device 10 with its own power. A hand brake or other brake mechanism may be equipped on, or in conjunction with, device 10 to control wheels 20 and allow a user to stop or slow the apparatus as desired.

Due to enclosing the animal within device 10, trainers may be able to "imprint" and/or desensitize the animal to human interaction without being worried the animal will buck or without serious injury to the trainer or the animal itself. Further, device 10 may allow beginner riders to safely learn how to ride an animal while experiencing the power of directing the animal on their own.

Further, device 10 may allow animals to be used for therapeutic activities or with handicapped individuals, for example, device 10 may be used in hippotherapy. Hippotherapy is a treatment that uses the multidimensional movement of a horse as a therapy for patients that have movement dysfunction.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular TRAINING DEVICE AND METHOD OF USING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A cradle for receiving a quadruped comprising:
   a first side bar having a front end and a back end;
   a second side bar having a front end and a back end;
   a front piece connected to said front end of said first side bar and said front end of said second side bar defining a first width;
   a second width defined between said back end of said first side bar and said back end of said second side bar;
   a first leg space defined within an outwardly extending portion of said first side bar between said front end and said back end of said first side bar;
   a second leg space defined within an outwardly extending portion of said second side bar between said front end and said back end of said second side bar, and
   where a third width between said first leg space and said second leg space is greater than said first and second widths, such that the legs of a rider, atop a quadruped located between said first and second side bars, are positionable within said first and second leg spaces.

2. The device of claim 1 further comprising:
   a back piece having a first end releasably connected to said back end of said first side bar, and said back piece having a second end releasably connected to said back end of said second side bar.

3. The device of claim 2 further comprising:
   said first end of said back piece is pivotally and releasably connected to said back end of said first side bar; and
   said second end of said back piece is pivotally and releasably connected to said back end of said second side bar.

4. The device of claim 1 further comprising:
   a first back fit bar hingedly connected to said first side bar; and
   a second back fit bar hingedly connected to said second side bar, and
   where said first back fit bar and said second back fit bar are spaced a fourth width apart when in a closed position and said first back fit bar and said second back fit bar are spaced said fifth width apart when in an open position.

5. The device of claim 4 further comprising:
   said first back fit bar having two lock pieces and said second back fit bar having two lock pieces, and
   where said lock pieces receive a back piece when said first back fit bar and said second back fit bar are in said closed position and said back piece is in a dosed position.

6. The device of claim 4 further comprising:
said first fit bar tapers toward said first side bar; and
said second fit bar tapers toward said second side bar.

7. The device of claim 1 further comprising:
a first front fit bar connected to said front piece and said first side bar; and
a second front fit bar connected to said front piece and said second side bar, and
where a third space between said first front fit bar and said second front fit bar is less than said first width.

8. The device of claim 1 where said device is portable and further comprising:
a first back wheel slidingly attached to said back end of said first side bar;
a second back wheel slidingly attached to said back end of said second side bar.

9. The device of claim 8 further comprising:
said first back wheel and said second back wheel are vertically and horizontally adjustable with respect to said first side bar and said second side bar.

10. The device of claim 1 where said first side bar comprises at least two segments and where said device is capable of receiving a quadruped in a space defined by said first side bar, said second side bar and said front piece.

11. A cradle for receiving a quadruped comprising:
a first side bar having a front end and a back end;
a second side bar having a front end and a back end;
a front piece connected to said front end of said first side bar and said front end of said second side bar defining a first width;
a second width defined between said back end of said first side bar and said back end of said second side bar;
a first leg space defined within an outwardly extending portion of said first side bar between said front end and said back end of said first side bar;
a second leg space defined within an outwardly extending portion of said second side bar between said front end and said back end of said second side bar
where a third width between said first leg space and said second leg space is greater than said first and second widths, such that the legs of a rider, atop a quadruped located between said first and second side bars, are positionable within said first and second leg spaces, and
a first fit bar connected to said first side bar;
a second fit bar connected to said second side bar;
a third fit bar rotationally connected to a back end of said first side bar; and
a fourth fit bar rotationally connected to a back end of said second side bar.

12. The cradle of claim 11, further comprising:
said back end of said first side bar and said back end of said second side bar overlap and engage a back piece.

13. The cradle of claim 11, further comprising:
said first fit bar has a first portion parallel to said second side bar and a second portion tapered toward said first side bar; and
said second fit bar has a first portion parallel to said first side bar and a second portion tapered toward said second side bar.

14. The cradle of claim 11, further comprising:
a front strap connected to said front end of said first side bar and said front end of said second side bar; and
a back strap connected to said back end of said first side bar and said back end of said second side bar, and
where said front strap and said back strap are connected to said first side bar and said second side bar within an enclosed area defined by said front end, said first side bar, said second side bar and said back end.

15. A cradle for receiving a quadruped comprising:
a first side bar having a front end and a back end:
a second side bar having a front end and a back end;
a front piece connected to said front end of said first side bar and said front end of said second side bar defining a first width:
a second width defined between said back end of said first side bar and said back end of said second side bar:
a first leg space defined within an outwardly extending portion of said first side bar between said front end and said back end of said first side bar:
a second leg space defined within an outwardly extending portion of said second side bar between said front end and said back end of said second side bar,
where a third width between said first leg space and said second leg space is greater than said first and second widths, such that the legs of a rider, atop a quadruped located between said first and second side bars, are positionable within said first and second leg spaces: and
at least one movable fit bar for narrowing an area in which the quadruped stands.

16. The cradle of claim 15 where said cradle defines at least one leg space such that a spaced relationship is consistently maintained between the quadruped and a middle portion of said cradle.

17. The cradle of claim 16 where said cradle defines two leg spaces positioned at opposing sides of a middle portion of said cradle, each of said leg spaces configured such that a spaced relationship exists between the standing quadruped and said middle portion of said cradle.

* * * * *